Patented Apr. 19, 1938

2,114,866

UNITED STATES PATENT OFFICE 2,114,866

PURIFICATION OF ESTERS OF INORGANIC ACIDS

Thomas H. Vaughn, Niagara Falls, N. Y., assignor to Carbide and Carbon Chemicals Corporation, a corporation of New York No Drawing. Application February 8, 1936, Serial No. 63,039

16 Claims. (Cl. 260—98)

This invention relates to the purification and stabilization of organic esters of inorganic acids. It has especial utility in connection with the removal from organic silicates of the hydrogen halide formed during the production of the ester by reacting an alkyl or aryl hydroxy compound with a silicon tetrahalide.

Among the more important objects of the invention are: the production of neutral, or non-acidic stable organic esters of inorganic acids; to provide in novel manner for removing the last traces of acidic impurities from mixtures containing organic esters of inorganic acids together with such impurities, while preventing or limiting hydrolysis of the said esters; and to provide for the stabilization of such esters by treatment thereof with basic nitrogen-containing compounds such as anhydrous ammonia, and certain amines and substituted amines.

In the practice of the invention, an organic ester of an inorganic acid containing the acid or acidic impurity such as an inorganic halide is treated with a basic nitrogen-containing compound that is soluble in the said ester, thereby forming an addition product with the acidic impurity, which product subsequently is removed from the reaction mixture. Among the compounds found suitable for the purpose are anhydrous ammonia, certain mono-, di-, and tri-alkyl, aryl, and alkylol amines, and basic nitrogen-containing cyclic compounds such as pyridine and piperidine. These compounds react with the acid impurity to form readily removable addition products without entering into undesired reactions with the said esters, which addition products preferably possess a volatility equal to or lower than that of triamylamine hydrochloride.

Compounds found especially suitable for use in the process include mono-, di-, and tributyl amines; mono-, di-, and triamyl amines; monoethanol amine, aniline, monomethyl aniline, toluidine, xylidine, pyridine, α-picoline, piperidine, anhydrous ammonia, morpholine, and morpholine derivatives such as morpholine ethanol, and morpholine ethanol alkyl ethers.

These compounds are highly effective for the purification and stabilization of alkyl silicates, especially of the tetramethyl and tetraethyl silicates and the corresponding condensed silicates, though also applicable to the treatment of other silicic acid esters and esters of other inorganic acids in which the said compounds are soluble.

The compounds preferably are employed in substantially anhydrous condition, since the esters being stabilized are more or less readily hydrolyzed in the presence of water.

The esters being treated in accordance with this invention preferably are substantially anhydrous, as in the case of the silicic acid esters which are formed by reacting a silicon tetrahalide with anhydrous alcohols.

Referring more particularly to the stabilization of silicic acid esters containing hydrogen chloride formed therein in the course of their production, treatment thereof with certain of the amines, like diamyl amine and pyridine, yields precipitates of the corresponding amine hydrochlorides under the conditions of operation. This precipitate may be separated from the silicic acid ester by filtration or equivalent physical means, and the ester then distilled in accordance with the usual practice.

Other amines, such as triamyl amine, monoamyl amine, and monoethanol amine, form with the hydrochloric acid present in the ester amine hydrochlorides that are soluble in the silicic acid ester. Fractional distillation of the reaction mixture then removes the purified, stabilized silicic acid ester, leaving behind in the still any excess of treating agent, together with the amine hydrochloride or other product formed by the reaction of the treating agent with the hydrochloric acid. The specific temperature conditions under which the distillation is conducted depend upon such factors as the nature of the ester being processed, and upon the particular treating agent being utilized.

The following examples serve to illustrate the invention:

Example I 500 g. of the dry tetramethyl silicate obtained by the interaction of silicon tetrachloride and anhydrous methanol, and containing hydrochloric acid, was heated to 80°–90° C., and a stream of dry air was bubbled through it. After approximately one hour the air was shut off and the product was allowed to cool. It still contained about 4% of hydrochloric acid. 150 grams of dry triamyl amine was added to the ester at room temperature. This constituted an excess of the amine over that required to neutralize the residual acid. Following a vigorous reaction, the resultant mixture was fractionally distilled. A short forerun, consisting principally of methanol, came over; followed by 300 grams of pure tetramethyl silicate, boiling at 120°–122° C., which was free of acid and was separately collected.

The still residue remaining after the distillation, which contained triamyl amine and triamyl amine hydrochloride, was cooled and treated with 200 cc. of a 15% aqueous solution of sodium hydroxide. An oily layer which separated was recovered, dried over solid KOH, and fractionally distilled. Thus approximately 90% of the triamylamine was recovered as a fraction boiling at 135°–155° C.

The treating agent may be added to the ester at any temperature up to the boiling point of the ester. However, since considerable heat is produced by the combination of the treating agent and the acid in the ester, it is necessary to absorb heat if the reaction is conducted at a temperature close to the said boiling point. This is readily accomplished by external cooling, or by use of a reflux condenser, etc. Atmospheric pressure may be employed, though subatmospheric and superatmospheric pressures are equally suitable.

Generally it is preferred to utilize in the process reagents forming hydrochlorides of somewhat lower volatility than triamyl amine hydrochloride. Monobutyl amine is an example of such a reagent. This facilitates the separation of the ester and the amine hydrochloride upon distillation.

When anhydrous ammonia is added to a silicic acid ester, a small precipitate forms, which largely goes into solution upon slight warming of the mixture. If the ester is contaminated with hydrogen chloride, a precipitate of $NH_4Cl$ forms in the reaction mixture; and fractional distillation of the latter is required, with or without a prior filtration step, as described above. The ammonia may be bubbled through the silicic acid ester, or the admixture may be effected in other obvious ways.

*Example II*

Gaseous anhydrous ammonia was bubbled through 64 grams of crude tetramethyl silicate containing 12 grams of dry hydrogen chloride until the mixture was alkaline to methyl red. A vigorous action occurred, yielding a heavy precipitate of $NH_4Cl$ which was filtered off. The filtrate was distilled, and a very pure tetramethyl silicate boiling at about 120°–122° C. was secured. By preventing the temperature of the mixture from rising, during the reaction between the ammonia and the hydrogen chloride in the ester, to a point where substantial volatilization of the ester occurs, the yield of the latter is improved.

Crude methyl or ethyl borate, produced by reacting together $BCl_3$ and the corresponding alcohol, and containing hydrogen chloride therein, may be purified in the manner described supra.

*Example III*

A 70% solution of trimethyl borate in methyl alcohol and saturated with dry hydrogen chloride was treated with triamyl amine until the solution was basic to methyl red. This mixture then was distilled at atmospheric pressure, and a hydrogen chloride-free azeotropic mixture of about 70% trimethyl borate in methyl alcohol was recovered as a distillate, boiling at about 54°–56° C. (The alcohol may be removed from this mixture by washing the latter with cold concentrated sulfuric acid, leaving the pure trimethyl borate. The washed borate preferably then is distilled to remove small amounts of sulfur compounds, etc.) The unreacted triamyl amine and the triamyl amine hydrochloride remained behind as a still residue, from which the amine could be recovered readily for reuse by treatment with caustic alkali in well-known manner.

*Example IV*

Dry condensed ethyl silicate containing hydrogen chloride therein had added thereto slowly a small amount of morpholine, until the mixture was alkaline to methyl red, indicating complete hydrogen chloride removal. A heavy precipitate of the amine hydrochloride occurred, which was removed by filtration. The filtrate containing the purified silicate may be fractionally distilled, if desired, for removal of any unreacted morpholine and any last trace of impurities.

In like manner, other morpholine derivatives and homologues soluble to some degree in the silicon ester to be purified, such as morpholine ethanol, and morpholine ethanol ethyl ether, may be substituted for morpholine.

In the practice of the invention it is preferable that sufficient of the basic reagent be used to render the mixture basic to methyl red, thus insuring complete removal of the hydrogen chloride. The presence in the reaction mixture of even a large excess of the reagent apparently does not produce undesired reactions.

The invention is applicable not only to the treatment of organic silicates, but to the esters of other inorganic acids, such as the alkyl and aryl esters of boric acid, ortho-phosphoric acid, symmetrical phosphorous acid, arsenic acid and symmetrical arsenious acid. Such esters may be produced by the reaction of alcohols, alcoholates, or phenols, with the inorganic halides: $SiX_4$, $SiHX_3$, $SOX_2$, $SO_2X_2$, $PX_3$, $PX_5$, $POX_3$, $BX_3$, $SeOX_2$, $TeX_4$, $SnX_4$, $TiX_4$, $SbX_3$, $SbX_5$, $AsX_3$, $AsX_5$, $NOX$, $VOX_3$, $CrO_2X_2$, $MnO_3X$, wherein X represents a halogen.

Organic silicates purified and stabilized by the present invention have important uses as paint media; and as components of various other coating and impregnating compositions and plastic mixtures wherein free acid is objectionable, such as those used in the production or treatment of refractory molds used in connection with the casting of high melting metals and alloys.

The purified and stabilized organic borates may be used as intermediates to introduce an alkyl or aryl group into various chemical compounds. Methyl borate, and the azeotropic mixtures thereof with the corresponding alcohol, are serviceable as volatile fluxing agents in various welding and similar operations conducted at high temperatures.

The term "basic nitrogen-containing compound" as used in the specification and claims is intended to embrace not only anhydrous ammonia and various alkyl amines, but, also basic nitrogen-containing ring compounds and nitrogen derivatives of polyhydric alcohols, which substances are soluble in substantial degree in the ester being treated, and which react with the acid present therein in the manner described.

The expression "basic ring compound containing nitrogen in the ring" appearing in the claims is intended to designate heterocyclic compounds having nitrogen in the nuclei, such as pyridine, α-picoline, piperidine, morpholine and its homologues, and morpholine derivatives such as the morpholine ethanols and the morpholine alkylol alkyl ethers.

I claim:

1. The process of purifying and stabilizing a non-acidic ester of an inorganic acid containing free hydrogen halide, which comprises mixing with the said ester a basic nitrogen-containing compound soluble in the ester, reacting the hydrogen halide therewith, and separately recovering the purified and stabilized ester thus produced.

2. The process of purifying and stabilizing a non-acidic ester of an inorganic acid containing free hydrogen halide, which comprises mixing with the said ester a basic nitrogen-containing compound soluble in the ester and selected from the group consisting of the mono-, di-, and tributyl amines; the mono-, di-, and triamyl amines; monoethanol amine, aniline, monomethyl aniline, toluidine, xylidine, pyridine, α-picoline, piperidine, anhydrous ammonia, morpholine, morpholine ethanol, and morpholine ethanol ethyl ether, reacting the hydrogen halide therewith, and separately recovering the purified and stabilized ester thus produced.

3. The process of purifying and stabilizing a non-acidic ester of an inorganic acid containing free hydrogen halide, which comprises mixing with the said ester a basic organic derivative of ammonia which is soluble in the said ester, reacting the hydrogen halide therewith, and separately recovering from the resultant reaction mixture the thus-purified ester.

4. The process of purifying and stabilizing a non-acidic ester of an inorganic acid containing free hydrogen halide, which comprises mixing with the said ester an amine soluble in the ester in amount sufficient to neutralize the hydrogen halide contained therein, reacting the hydrogen halide with the said amine, and distilling from the resultant reaction mixture the thus-purified ester.

5. The process of purifying and stabilizing a non-acidic alkyl ester of an inorganic acid containing free hydrogen halide, which comprises treating the said ester with a basic ring compound containing nitrogen in the ring, which compound is soluble in the said ester, reacting therewith the hydrogen halide, and separating from the resultant reaction mixture the thus-purified ester.

6. Process for purifying and stabilizing a non-acidic alkyl silicate containing free hydrogen halide, which comprises mixing with the said silicate a small amount of a basic nitrogen-containing compound that is at least partially soluble in the said silicate, and reacting the hydrogen halide with the said compound.

7. Process for purifying and stabilizing a non-acidic alkyl silicate containing free hydrogen halide, which comprises mixing with the said silicate a small amount of a basic nitrogen-containing compound that is at least partially soluble in the said silicate, reacting the hydrogen halide with the said compound, and separately recovering from the reaction mixture the purified silicate.

8. Process for purifying and stabilizing a non-acidic alkyl silicate containing free hydrogen halide, which comprises mixing the said silicate with a compound selected from the group consisting of the mono-, di-, and tributyl amines; the mono-, di-, and triamyl amines; monoethanol amine, aniline, monomethyl aniline, toluidine, xylidine, pyridine, α-picoline, piperidine, anhydrous ammonia, morpholine, morpholine ethanol, and morpholine ethanol ethyl ether, reacting the hydrogen halide with the said compound, and separately recovering from the resultant reaction mixture the purified silicate.

9. Process for purifying and stabilizing a non-acidic alkyl silicate containing free hydrogen halide, which comprises mixing with the said silicate a basic organic derivative of ammonia soluble in the said silicate, reacting the hydrogen halide with the latter, and thereafter recovering from the resultant reaction mixture the purified silicate.

10. Process for purifying and stabilizing a non-acidic alkyl silicate containing free hydrogen halide, which comprises mixing with the said silicate an amine at least partially soluble in the said silicate, reacting the hydrogen halide with the latter, and thereafter recovering from the resultant mixture the purified silicate.

11. Process for purifying and stabilizing a non-acidic alkyl silicate containing free hydrogen halide, which comprises mixing with the said silicate anhydrous ammonia, reacting the hydrogen halide with the latter, and thereafter recovering from the resultant reaction mixture the purified silicate.

12. Process for purifying and stabilizing a non-acidic alkyl silicate containing free hydrogen halide, which comprises mixing with the said silicate a morpholine, reacting the hydrogen halide with the latter, and thereafter recovering from the resultant reaction mixture the purified silicate.

13. In the process of purifying and stabilizing a non-acidic ester of an inorganic acid containing free hydrogen halide, in which the said ester has admixed therewith a basic nitrogen-containing compound soluble in the ester, and the hydrogen halide reacts with the said compound, thereby forming a hydrogen halide derivative of the latter, the ester then is separated from the reaction mixture, and the basic compound is separately recovered for reuse in the process the steps which comprise reacting the residual mixture with an aqueous solution of an alkali, separating and drying an oily layer thereby formed containing the free basic compound, fractionally distilling the said layer, and separately condensing the fraction containing the said free basic compound.

14. The process for purifying and stabilizing a hydrolyzable, non-acidic, substantially anhydrous ester of an inorganic acid containing free hydrogen halide, which comprises neutralizing the free hydrogen halide under conditions preventing substantial decomposition of the said ester, and separating from the resultant reaction mixture the thus-purified ester.

15. The process for purifying and stabilizing a non-acidic ester of an inorganic acid containing free hydrogen halide, which comprises mixing with the said ester a substantially anhydrous basic nitrogen-containing compound selected from the group consisting of the mono-, di-, and tributyl amines; the mono-, di-, and triamyl amines; monoethanol amine, aniline, monomethyl aniline, toluidine, xylidine, pyridine, α-picoline, piperidine, anhydrous ammonia, morpholine, morpholine ethanol, and morpholine ethanol ethyl ether, reacting the hydrogen halide therewith, and separately recovering the purified and stabilized ester thus produced.

16. Process for purifying and stabilizing a non-acidic alkyl silicate containing free hydrogen halide, which comprises mixing with the said silicate a small amount of a substantially anhydrous basic nitrogen-containing compound that is at least partially soluble in the said silicate, reacting the hydrogen halide with the said compound, and separately recovering from the reaction mixture the purified alkyl silicate.

THOMAS H. VAUGHN.